United States Patent
Liu et al.

(10) Patent No.: US 12,507,254 B2
(45) Date of Patent: Dec. 23, 2025

(54) INFORMATION DETERMINING METHOD, INFORMATION SENDING METHOD, TERMINAL, AND NETWORK SIDE DEVICE

(71) Applicant: VIVO MOBILE COMMUNICATION CO., LTD., Dongguan (CN)

(72) Inventors: Siqi Liu, Dongguan (CN); Gen Li, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 292 days.

(21) Appl. No.: 18/106,453

(22) Filed: Feb. 6, 2023

(65) Prior Publication Data

US 2023/0189290 A1 Jun. 15, 2023

Related U.S. Application Data

(63) Continuation of application No. PCT/CN2021/110515, filed on Aug. 4, 2021.

(30) Foreign Application Priority Data

Aug. 7, 2020 (CN) .......................... 202010791657.X

(51) Int. Cl.
*H04W 72/23* (2023.01)
*H04W 72/232* (2023.01)

(52) U.S. Cl.
CPC .................. *H04W 72/232* (2023.01)

(58) Field of Classification Search
CPC .................................................. H04W 72/232
See application file for complete search history.

(56) References Cited

U.S. PATENT DOCUMENTS

| 2020/0076554 A1 | 3/2020 | Dou et al. |
| 2020/0077386 A1 | 3/2020 | Papasakellariou |
| 2023/0072342 A1* | 3/2023 | Wang ................ H04W 72/23 |

FOREIGN PATENT DOCUMENTS

| CN | 101605375 A | 12/2009 |
| CN | 109474375 A | 3/2019 |
| CN | 110830216 A | 2/2020 |
| CN | 111212386 A | 5/2020 |
| CN | 111245586 A | 6/2020 |
| CN | 111294960 A | 6/2020 |

OTHER PUBLICATIONS

International Search Report issued in corresponding International Application No. PCT/CN2021/110515, mailed Oct. 27, 2021, 4 pages.
Intel Corporation, "DCI design considerations for NR", 3GPP TSG-RAN WG1 #89 R1-1707384, May 2017.
First Office Action issued in related Chinese Application No. 202010791657.X, mailed Nov. 23, 2024, 11 pages.
CATT, "Discussion on joint DCI to support up to 32 CCs", 3GPP tsg_ran\WG1_RL1,R1-152567, May 2015, 1 page.
CMCC, "Analysis on the RAN1Reply LS on multiple SPS-CG for IIoT", 3GPP tsg_ran\wg2_rl2, R2-1909459, Aug. 2019, 6 pages.

\* cited by examiner

*Primary Examiner* — Ronald B Abelson
(74) *Attorney, Agent, or Firm* — IPX PLLC

(57) ABSTRACT

This application provides an information determining method, an information sending method, a terminal, and a network side device. The information determining method includes: receiving first DCI, where the first DCI may schedule multiple target objects, and determining feature information of at least some of information indication fields in the first DCI.

20 Claims, 5 Drawing Sheets

Receive first downlink control information DCI, where the first DCI schedules multiple target objects — 201

Determine feature information of at least some of information indication fields in the first DCI — 202

INFORMATION DETERMINING METHOD, INFORMATION SENDING METHOD, TERMINAL, AND NETWORK SIDE DEVICE

CROSS-REFERENCE TO RELATED APPLICATIONS

This application is a continuation of International Application No. PCT/CN2021/110515, filed on Aug. 4, 2021, which claims priority to Chinese Patent Application No. 202010791657.X, filed on Aug. 7, 2020. The entire contents of each of the above-referenced applications are expressly incorporated herein by reference.

TECHNICAL FIELD

This application pertains to the field of communications technologies, and in particular, to an information determining method, an information sending method, a terminal, and network side device.

BACKGROUND

Downlink Control Information (DCI) is carried by a Physical Downlink Control Channel (PDCCH), where the DCI is downlink control information sent by a network side device to a terminal, and the DCI may be used to schedule a target object.

In a New Radio (NR) system, each piece of DCI schedules one target object. Therefore, during communication between the terminal and the network side device, transmission of much DCI is required, resulting in relatively great overheads for DCI transmission.

SUMMARY

Embodiments of this application provide an information determining method, an information sending method, a terminal, and a network side device.

According to a first aspect, an information determining method is provided, applied to a terminal and including:
  receiving first DCI, where the first DCI schedules multiple target objects; and
  determining feature information of at least some of information indication fields in the first DCI.

According to a second aspect, an information determining apparatus is provided, applied to a terminal and including:
  a first receiving module, configured to receive first DCI, where the first DCI schedules multiple target objects; and
  a first determining module, configured to determine feature information of at least some of information indication fields in the first DCI.

According to a third aspect, an information sending method is provided, applied to a network side device and including:
  sending first DCI to a terminal, where the first DCI schedules multiple target objects, and the first DCI includes at least some of information indication fields.

According to a fourth aspect, an information sending apparatus is provided, applied to a network side device and including:
  a first sending module, configured to send first DCI to a terminal, where the first DCI schedules multiple target objects, and the first DCI includes at least some of information indication fields.

According to a fifth aspect, a terminal is provided, where the terminal includes a processor, a memory, and a program or an instruction that is stored in the memory and that can run on the processor, where when the program or instruction is executed by the processor, steps of the method according to the first aspect are implemented.

According to a sixth aspect, a network side device is provided, where the network side device includes a processor, a memory, and a program or an instruction that is stored in the memory and that can run on the processor, where when the program or instruction is executed by the processor, steps of the method according to the third aspect are implemented.

According to a seventh aspect, a readable storage medium is provided, where the readable storage medium stores a program or an instruction, and when the program or instruction is executed by a processor, steps of the method according to the first aspect or steps of the method according to the third aspect are implemented.

According to an eighth aspect, a chip is provided, where the chip includes a processor and a communication interface, the communication interface is coupled to the processor, and the processor is configured to run a program or an instruction, to implement the method according to the first aspect, or the method according to the third aspect.

According to a ninth aspect, a computer program product stored in a readable storage medium is provided, where the computer program product is executed by at least one processor to implement the method described in the first aspect or the method described in the third aspect.

According to a tenth aspect, an information determining apparatus is provided, applied to a terminal and configured to perform steps of the method according to the first aspect.

According to an eleventh aspect, an information sending apparatus is provided, applied to a network side device and configured to perform steps of the method according to the third aspect. In the embodiments of this embodiment, the first DCI is received, where the first DCI may schedule the multiple target objects, and then the terminal determines the feature information of at least some of the information indication fields in the first DCI. Therefore, the terminal may determine the feature information of at least some of information fields in the first DCI, to implement information determining. Because the received first DCI may schedule the multiple target objects, that is, one piece of DCI schedules the multiple target objects, for the multiple target objects, the network side device does not need to send DCI once for each target object, and the terminal does not need to receive DCI once for each target object, but only needs to receive the first DCI that may schedule the multiple target objects, thus reducing overheads for DCI transmission.

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. However, the following describes a New Radio (NR) system for example purposes, and NR terms are used in most of the following descriptions, although these technologies can also be applied to an application other than an NR system application, for example, a 6th Generation (6G) communications system.

Figures 1, 2:
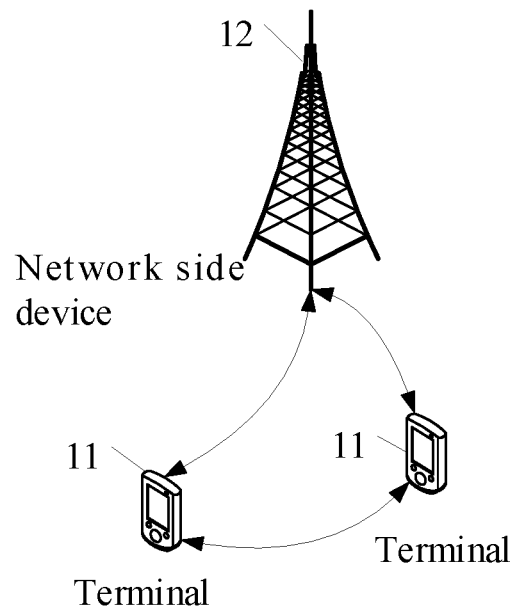
FIG. 1 is a structural diagram of a network system to which an embodiment of this application may be applied.
FIG. 2 is a schematic flowchart of an information determining method according to an embodiment of this application.

FIG. 1 is a block diagram of a wireless communications system to which an embodiment of this application can be applied. The wireless communications system includes a terminal 11 and a network side device 12. The terminal 11 may also be referred to as a terminal device or a User Equipment (UE). The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, a Vehicle User Equipment (VUE), or a Pedestrian User Equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB (eNB), an access point, a Base Transceiver Station (BTS), a radio base station, a radio transceiver, a Basic Service Set (BSS), an Extended Service Set (ESS), a NodeB, an eNB, a home NodeB, a home evolved NodeB, a WLAN access point, a Wi-Fi node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the information determining method provided in the embodiments of this application is described in detail by using specific embodiments and application scenarios.

As shown in FIG. 2, an embodiment of this application provides an information determining method, applied to a terminal and including:

Step 201: Receive first downlink control information DCI, where the first DCI schedules multiple target objects; and Step 202: Determine feature information of at least some of information indication fields in the first DCI.

The DCI is downlink control information sent by a network side device to the terminal. In an NR system, multiple DCI formats are defined, and DCI in different formats may be used for different purposes, for example, scheduling data, preempting a resource, notifying a slot format, controlling uplink power, and the like, where the slot is a time slot.

The first DCI includes one or more information indication fields, where an information indication fields may be understood as a field, and different information indication fields in the DCI are used to indicate different pieces of information and correspond to different functions. A Frequency Domain Resource Assignment (FDRA) field is an information indication field in the DCI. For example, the FDRA field is used to indicate a scheduled frequency domain resource, and a function of the FDRA field is frequency domain resource assignment.

In this embodiment, first, the terminal receives the first DCI sent by the network side device, and the received first DCI may schedule the multiple target objects. After the first DCI is received, the feature information of some of the information indication fields in the first DCI may be determined, to implement information determining. For example, the target objects may include at least one of a carrier, a cell, or a Bandwidth Part (BWP). Scheduling a target object may be understood as scheduling target data in the target object, where the target data may be multiple pieces of uplink data, multiple pieces of downlink data, or some of uplink data and some of downlink data.

For example, the feature information may be determined by the terminal according to a protocol or according to a preset rule, indicated by the network side device, or carried in configuration information obtained by the terminal. The configuration information includes at least one of the following: ServingCellConfig, PDSCH-Config, or PUSCH-Config. It should be noted that the configuration information obtained by the terminal may be received configuration information sent by the network side device, configuration information according to a protocol, or configuration information determined by the terminal.

In the information determining method of this embodiment, the first DCI is received, where the first DCI may schedule the multiple target objects, and then the terminal determines the feature information of at least some of the information indication fields in the first DCI. Therefore, the terminal may determine the feature information of at least some of information fields in the first DCI, to implement information determining. Because the received first DCI may schedule the multiple target objects, that is, one piece of DCI may schedule the multiple target objects, for the multiple target objects, the network side device does not need to send DCI once for each target object, and the terminal does not need to receive DCI once for each target object, but only needs to receive the first DCI that may schedule the multiple target objects, so that overheads for DCI transmission can be reduced.

Figure 3:
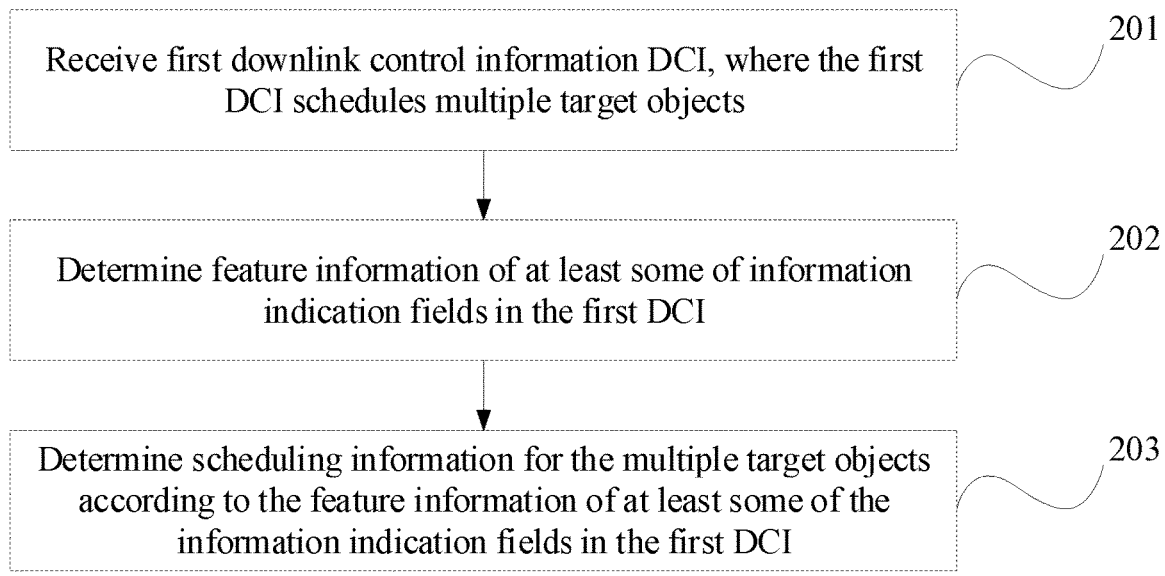
FIG. 3 is a schematic flowchart of an information determining method according to an embodiment of this application.

In some embodiments, as shown in FIG. 3, after step 202: determining feature information of at least some of the information indication fields in the first DCI, the method further includes:

Step 203: Determine scheduling information for the multiple target objects according to the feature information of at least some of the information indication fields in the first DCI.

The scheduling information for the target objects may be understood as scheduling information for scheduling the target objects. In this embodiment, the scheduling information for the multiple target objects is determined according to the feature information of at least some of the information indication fields, so that accuracy of the determined scheduling information can be improved.

It should be noted that the information indication field corresponding to multiple sub-indication fields can be understood as follows: under a same function, a corresponding target object may have different information fields, or an information indication field includes multiple information indication fields. For example, if the information indication field is the frequency domain resource assignment, and the DCI includes two frequency domain resource assignment fields for different scheduled cells, the information indication field may be regarded as a whole of all frequency domain resource assignment fields in the DCI, and two frequency domain resource assignment fields are two sub-indication fields respectively. In some alternative embodiments, the information indication field corresponding to multiple sub-indication fields can be understood as some of the information indication fields or some bits in the information indication field. For example, the information indication field corresponds to 10 bits, where first 5 bits are one sub-indication field and last 5 bits are another sub-indication field.

In some embodiments, the feature information of at least some of the information indication fields includes at least one of the following:
 a quantity of sub-indication fields corresponding to each information indication field in at least some of the information indication fields;
 a quantity of bits of each information indication field in at least some of the information indication fields;
 a quantity of sub-indication fields corresponding to each information indication field in at least some of the information indication fields; or a type of at least some of the information indication fields.

A quantity of bits of an information indication field is a sum of bits of a sub-indication field corresponding to the information indication field. The type of at least some of the information indication fields may be understood as an overall type of at least some of the information indication fields or a type of each information indication field in at least some of the information indication fields.

In some embodiments, the determining feature information of at least some of the information indication fields in the first DCI includes at least one of the following:
 obtaining feature indication information, where the feature indication information indicates feature information of at least some of the information indication fields; and
 determining a type of at least some of the information indication fields in the first DCI, and determining sub-feature information of at least some of the information indication fields according to the type of at least some of the information indication fields.

The sub-feature information includes at least one of the following:
 a quantity of sub-indication fields corresponding to each information indication field in at least some of the information indication fields;
 a quantity of bits of each information indication field in at least some of the information indication fields; or
 a quantity of bits of sub-indication fields corresponding to each information indication field in at least some of the information indication fields.

That is, in this embodiment, the feature indication information indicating feature information of at least some of the information indication fields may be obtained, so that the feature information of at least some of the information indication fields in the first DCI can be determined. In some alternative embodiments, the type of at least some of the information indication fields is determined first, and then the sub-feature information of at least some of the information indication fields is determined through the type of at least some of the information indication fields, so that the feature information of at least some of the information indication fields can be determined. Therefore, accuracy of the determined feature information of at least some of the information indication fields can be improved.

For example, the feature indication information may be specified according to a protocol, obtained by the terminal according to a preset rule, or sent by the network side device.

In some embodiments, determining the type of at least some of the information indication fields in the first DCI includes:
 obtaining type indication information, where the type indication information indicates a type of at least some of the information indication fields.

Type indication information indicating a type of at least some of the information indication fields may be obtained, so that the type of at least some of the information indication fields in the first DCI can be determined.

For example, the type indication information may be specified according to a protocol, obtained by the terminal according to a preset rule, or sent by the network side device.

For example, the terminal may receive type indication information sent by the network side device, where the type indication information may be Radio Resource Control (RRC) signaling, Media Access Control-Control Element (MAC-CE) signaling, or DCI, and configure, enable, disable, or modify the type of the information indication field through the type indication information, so that the type of the information indication field can be determined.

In some embodiments, the obtaining type indication information, where the type indication information indicates a type of at least some of the information indication fields includes: that the type indication information indicates a type of each information indication field in at least some of the information indication fields.

A quantity of at least some of the information indication fields may be one or more. In this embodiment, the type indication information is obtained, where the type indication information may indicate the type of each information indication field in at least some of the information indication fields. That is, the type of each information indication field in at least some of the information indication fields may be determined, and sub-feature information of at least some of the information indication fields can be determined according to the type of each information indication field in at least some of the information indication fields.

In some embodiments, at least some of the information indication fields in the first DCI include a first information indication field of a first type and/or a second information indication field of a second type.

For different types of at least some of information fields in the first DCI, different schedules can be determined. In this embodiment, the type of at least some of the information indication fields may include the first type and/or the second type, and then scheduling of multiple target objects may be determined based on the first information indication field of the first type and/or the second information indication field of the second type of at least some of the information indication fields, so that accuracy of the determined multiple target objects can be improved.

In some embodiments, in a case that the first DCI includes the first information indication field, a quantity of sub-indication fields corresponding to any information indication field of the first information indication field is N or M, where M<N, and N is a quantity of the multiple target objects.

M is a positive integer, and N is an integer greater than 1. In this embodiment, if the first information indication field of the first type exists in the first DCI, a quantity of sub-indication fields corresponding to any of the first information indication field is at most a quantity of the multiple target objects, which can prevent a problem of resource waste caused by an excessive quantity of sub-indication fields.

In some embodiments, the first information indication field is a required information indication field in the first DCI and/or the first information indication field has a default value.

It can be understood that the required information indication field in the first DCI may be indicated as the first type, and the information indication field with the default value in the first DCI may also be indicated as the first type. For example, the first type is a special type. The special type may be understood to be specially used for a cell, BWP, carrier, or data, that is, different cells, BWPs, or carriers, or different pieces of data will have corresponding instructions respectively.

In some embodiments, in at least some of the sub-indication fields corresponding to any first indication field in the first information indication field, each sub-indication field corresponds to a different scheduled target object. Accordingly, scheduling interference can be reduced, and a target object can be scheduled more stably.

In some embodiments, in a case that the DCI includes a second information indication field, a quantity of sub-indication fields corresponding to any information indication field in the second information indication field is N or 1, where N is a quantity of the multiple target objects.

In this embodiment, if a second information indication field of the second type exists in the first DCI, and a quantity of a sub-indication fields corresponding to any of the second information indication field is the quantity of the multiple target objects or 1, a problem of resource waste caused by an excessive quantity of sub-indication fields may be prevented.

In some embodiments, the second information indication field is an information indication field in the first DCI and/or the second information indication field does have a default value.

It can be understood that the information indication field in the first DCI may be indicated as the second type, and the information indication field without the default value in the first DCI may also be indicated as the second type. For example, the second type is a shareable type. The shareable type may be understood to be specially shared by multiple cells, BWPs, or carriers, or multiple pieces of data, that is, different cells, BWPs, or carriers, or different pieces of data may correspond to a same indication.

For example, the second information indication field may further include at least one of the following:
 a Sounding Reference Signal (SRS) Resource Indicator (SRI);
 a beta offset;
 a Transmit Power Control command (TPC command); or
 a field (indication field) related to a Physical Uplink Control Channel (PUCCH).

The field related to the PUCCH is, for example, PUCCH resource indication information, Hybrid Automatic Repeat reQuest (HARD) feedback delay, or the like.

It can be understood that the at least one of the information indication field in the first DCI may be indicated as the second type.

In some embodiments, the feature information of at least some of the information indication fields includes the quantity of the sub-indication fields corresponding to each information indication field in at least some of the information indication fields.

In a case that the first DCI includes the first information indication field of the first type, the determining scheduling information for the multiple target objects according to the feature information of at least some of the information indication fields in the first DCI includes:
 in a case that the first information indication field includes a first target information indication field, and at least some of M sub-indication fields of the first target information indication field have a corresponding first target object, determining at least one of the following:
 that the first target object is scheduled according to a corresponding sub-indication field; and
 at least some of other target objects do not support a function corresponding to a first target information indication field, where the first target information indication field is an information indication field in which a quantity of corresponding sub-indication fields in the first information indication field is M.

The first target object is a target object corresponding to at least some of the M sub-indication fields in the first information indication field of the multiple target objects. Because the quantity of the sub-indication fields corresponding to the first information indication field of the first type may be M or N, if the first information indication field of the first type includes the first target information indication field, that is, the first information indication field includes an information indication field with a quantity of sub-indication fields of M, it is determined that the first target object is scheduled according to a corresponding sub-indication field. In some alternative embodiments, in a case that the first information indication field includes the first target information indication field, and at least some of the M sub-indication fields of the first target information indication field correspond to the first target object, it is determined that at least some of other target objects do not support the function corresponding to the first target information indication field. It can be understood that at least some of other target objects do not support being scheduled by a sub-indication field corresponding to the first target information indication field. For example, an aperiodic Channel State Information (CSI) report and/or aperiodic CSI request and/or SRS and/or aperiodic SRS and/or aperiodic measurement report. It should be noted that other target objects are objects other than the first target object of the multiple target objects. In addition, each sub-indication field has a corresponding first target object, that is, at least some of the sub-indication fields have a corresponding first target object, which can be understood as that each sub-indication field in at least some of the sub-indication fields has the corresponding first target object.

In some embodiments, the feature information of at least some of the information indication fields includes the quantity of the sub-indication fields corresponding to each information indication field in at least some of the information indication fields.

In a case that the first DCI includes the first information indication field of the first type, the determining scheduling information for the multiple target objects according to the feature information of at least some of the information indication fields in the first DCI includes:

in a case that the first information indication field includes a first target information indication field, and at least some of M sub-indication fields of the first target information indication field have a corresponding first target object, determining at least one of the following:
that the first target object is scheduled according to a corresponding sub-indication field; and
that at least some of other target objects support the function corresponding to the first target information indication field; or
that at least some of other target objects are scheduled according to a first adjusted sub-indication field.

The first adjusted sub-indication field is a result after a sub-indication field corresponding to the first target object is adjusted by using a first preset offset, and the first target information indication field is an information indication field with a quantity of corresponding sub-indication fields in the first information indication field of M.

That is, the first target object is a target object corresponding to at least some of the M sub-indication fields in the first information indication field of the multiple target objects. Because the quantity of the sub-indication fields corresponding to the first information indication field of the first type may be M or N, if the first information indication field of the first type includes the first target information indication field, that is, the first information indication field includes an information indication field with a quantity of sub-indication fields of M. In a case that the first information indication field includes the first target information indication field, and at least some of the M sub-indication fields of the first target information indication field have a corresponding first target object, it can be determined that the first target object is scheduled according to a corresponding sub-indication field.

In some alternative embodiments, in a case that the first information indication field includes the first target information indication field, and at least some of the M sub-indication fields of the first target information indication field correspond to the first target object, it is determined that at least some of other target objects support the function corresponding to the first target information indication field. It can be understood that at least some of other target objects support being scheduled by a sub-indication field corresponding to the first target information indication field. It should be noted that other target objects are objects other than the first target object of the multiple target objects.

In addition, in some alternative embodiments, in a case that the first information indication field includes the first target information indication field, and at least some of the M sub-indication fields of the first target information indication field correspond to the first target object, it is determined that at least some of other target objects are scheduled according to the first adjusted sub-indication field.

In some embodiments, the adjusting a sub-indication field corresponding to the first target object by using a first preset offset can be understood as offsetting a sub-indication field corresponding to the first target object by using the first preset offset, to obtain the first adjusted sub-indication field. For example, if the sub-indication field corresponding to the first target object is 1, and the sub-indication field is offset by adding one (the first preset offset is 1), the obtained first adjusted sub-indication field is 2. It can also be understood that offsetting a meaning indicated by the sub-indication field corresponding to the first target object by using the first preset offset, to implement adjustment of the meaning indicated by the sub-indication field corresponding to the first target object, can be understood as implementing adjustment of the sub-indication field corresponding to the first target object, so as to obtain the first adjusted sub-indication field. For example, the sub-indication field corresponding to the first target object is 1, and the meaning indicated by the sub-indication field corresponding to the first target object is X, X is offset by using the first preset offset, and then the meaning indicated by the first adjusted sub-indication field is a result after offsetting X.

For example, the first DCI schedules a CC1 cell and a CC2 cell, and a Modulation and Coding Scheme (MCS) information indication field in the first DCI carries only a 5-bit MCS indication field, and the MCS indication field corresponds to the CC1. In this case, the CC2 uses a value, for transmission, offset by a delta1 from an MCS indication field corresponding to the CC1, that is, the MCS used by the CC2 is the MCS indication field of CC1+delta1, or the MCS used by the CC2 is the MCS indication field of CC1−delta1. In some embodiments, the value delta1 of the MCS indication field of the CC2 corresponding to the MCS indication field of the CC1 may be configured through the RRC, MAC-CE, or DCI.

In some embodiments, the feature information of at least some of the information indication fields includes the quantity of the sub-indication fields corresponding to each information indication field in at least some of the information indication fields.

In a case that the first DCI includes the second information indication field of second first type, the determining scheduling information for the multiple target objects according to the feature information of at least some of the information indication fields in the first DCI includes:

in a case that the second information indication field includes a second target information indication field, and a sub-indication field of the second target information indication field has a corresponding second target object, determining at least one of the following:
that the second target object is scheduled according to a corresponding sub-indication field;

that at least some of other target objects support a function corresponding to the second target information indication field; or that at least some of other target objects are scheduled according to a sub-indication field corresponding to at least some of the second target objects or at least some of other target objects are scheduled according to a second adjusted sub-indication field.

The second adjusted sub-indication field is a result after a sub-indication field corresponding to the second target object is adjusted by using a second preset offset, and the second target information indication field is an information indication field with a quantity of corresponding sub-indication fields in the second information indication field of 1.

The second target object is a target object corresponding to a sub-indication field of the second information indication field among the multiple target objects. Because the quantity of the sub-indication fields corresponding to the second information indication field of the second type may be 1 or N, if the second information indication field of the second type includes the second target information indication field, that is, the second information indication field includes an information indication field with a quantity of sub-indication fields of 1, it is determined that the second target object is scheduled according to a corresponding sub-indication field.

In some alternative embodiments, in a case that the second information indication field includes the second target information indication field and the sub-indication field of the second target information indication field corresponds to the second target object, it is determined that at least some of other target objects support a function corresponding to the second target information indication field. It can be understood that at least some of other target objects support being scheduled by the sub-indication field corresponding to the second target information indication field. It should be noted that other target objects are objects other than the second target object of the multiple target objects.

In some alternative embodiments, in a case that the second information indication field includes the second target information indication field and the sub-indication field of the second target information indication field corresponds to the second target object, it is determined that at least some of other target objects are scheduled according to a sub-indication field corresponding to at least some of the second target objects or at least some of other target objects are scheduled according to a second adjusted sub-indication field. It can be understood that at least some of other target objects support being scheduled by the sub-indication field corresponding to at least some of the second target information indication fields. It should be noted that other target objects are objects other than the second target object of the multiple target objects.

For example, only one indication field exists in the frequency domain resource assignment field of the first DCI, and this indication field corresponds to a CC11, and the indication field indicates to schedule RB #1-10 on a BWP of the CC1 cell, and then RB #1-10 on a BWP of the CC2 cell is also scheduled.

In some embodiments, the adjusting a sub-indication field corresponding to the second target object by using a second preset offset can be understood as offsetting a sub-indication field corresponding to the second target object by using the second preset offset, to obtain the second adjusted sub-indication field. For example, if the sub-indication field corresponding to the second target object is 1, and the sub-indication field is offset by adding one (the second preset offset is 1), the obtained second adjusted sub-indication field is 2. It can also be understood that offsetting a meaning indicated by the sub-indication field corresponding to the second target object by using the second preset offset, to implement adjustment of the meaning indicated by the sub-indication field corresponding to the second target object, can be understood as implementing adjustment of the sub-indication field corresponding to the second target object, so as to obtain the second adjusted sub-indication field. For example, the sub-indication field corresponding to the second target object is 1, and the meaning indicated by the sub-indication field corresponding to the second target object is Y, Y is offset by using the second preset offset, and then the meaning indicated by the second adjusted sub-indication field is a result after offsetting Y.

For example, the first DCI schedules the CC1 cell and the CC2 cell, and only one 5-bit sub-indication field exists in an information indication field in the first DCI, and the sub-indication field corresponds to the CC1. In this case, the CC2 uses a value, for transmission, offset by a delta2 from an MCS indication field corresponding to the CC1, that is, the MCS used by the CC2 is the MCS indication field of CC1+delta2, or the MCS used by the CC2 is the MCS indication field of CC1-delta2. In some embodiments, the value delta2 of the sub-indication field of the CC2 corresponding to the sub-indication field of the CC1 may be configured through the RRC, MAC-CE, or DCI.

In some embodiments, the determining feature information of at least some of the information indication fields includes:

determining the feature information of at least some of the information indication fields according to first configuration information of a scheduling cell.

That is, after the first DCI is received, the feature information of at least some of the information indication fields may be determined according to the first configuration information of the scheduling cell corresponding to the first DCI.

In some embodiments, the determining the feature information of at least some of the information indication fields includes: determining, according to the first configuration information of the scheduling cell, a quantity of and/or a quantity of bits of first target sub-indication fields in the sub-indication fields corresponding to at least some of the information indication fields, where a first target sub-indication field is a sub-indication field corresponding to a scheduled cell.

After the first DCI is received, the quantity of and/or the quantity of bits of the first target sub-indication fields in the sub-indication fields corresponding to at least some of the information indication fields may be determined according to the first configuration information of the scheduling cell corresponding to the first DCI. For example, the quantity of and/or the quantity of bits of the first target sub-indication fields in the sub-indication fields corresponding to at least some of the information indication fields is determined according to the first configuration information of the scheduling cell corresponding to at least some of the information indication fields. For example, the first configuration information of the scheduling cell includes second configuration information of each scheduled cell. The first configuration information may include ServingCellConfig or BWP-DownlinkDedicated, and the second configuration information may include PDSCH-Config and/or PUSCH-Config.

For example, the ServingCellConfig or BWP-DownlinkDedicated in the scheduling cell includes PDSCH-Config of each scheduled cell. According to these PDSCH-Configs, a quantity of and/or a quantity of bits of sub-indication fields corresponding to each scheduled cell in sub-indication fields corresponding to at least some of the information indication fields in the first DCI may be determined respectively.

For another example, the ServingCellConfig or BWP-DownlinkDedicated in the scheduling cell includes PUSCH-Config of each scheduled cell. According to these PDSCH-Configs, a quantity of and/or a quantity of bits of sub-indication fields corresponding to each scheduled cell in sub-indication fields corresponding to at least some of the information indication fields may be determined respectively.

For another example, assuming that the first DCI on the CC1 schedules the CC1 and CC2, BWP-DownlinkDedicated of the CC1 includes PDSCH-Config of the CC1 and CC2, which are PDSCH-Config-CC1 and PDSCH-Config-CC2, respectively. BWP-DownlinkDedicated is shown as follows:

```
"-- ASN1START
-- TAG-BWP-DOWNLINKDEDICATED-START
BWP-DownlinkDedicated ::=    SEQUENCE {
......omitted......
    pdsch-Config-CC1         SetupRelease { PDSCH-Config }
OPTIONAL,  -- Need M
    pdsch-Config-CC2         SetupRelease { PDSCH-Config }
OPTIONAL,  -- Need M
......omitted......
}
-- TAG-BWP-DOWNLINKDEDICATED-STOP
-- ASN1STOP"
```

Therefore, according to the PDSCHConfig-CC1 in the BWP-DownlinkDedicated, a quantity of and/or a quantity of bits of sub-indication fields corresponding to the CC1 in sub-indication fields corresponding to at least some of the information indication fields in the first DCI may be determined. According to the PDSCHConfig-CC2 in the BWP-DownlinkDedicated, a quantity of and/or a quantity of bits of sub-indication fields corresponding to the CC2 in sub-indication fields corresponding to at least some of the information indication fields in the first DCI may be determined.

In some embodiments, the determining feature information of at least some of the information indication fields includes:

determining, according to second configuration information of each scheduled cell, a quantity of and/or a quantity of bits of first target sub-indication fields in sub-indication fields corresponding to at least some of the information indication fields, where a first target sub-indication field is a sub-indication field corresponding to the scheduled cell.

For at least some of the information indication fields, scheduling of multiple target objects is determined according to the second configuration information of a scheduled cell corresponding to at least some of the information indication fields. For example, the second configuration information may include PDSCH-Config and/or PUSCH-Config.

For example, according to PDSCH-Config in Serving-Cell-Config or BWP-DownlinkDedicated of each scheduled cell, a quantity of and/or a quantity of bits of sub-indication fields corresponding to each scheduled cell in a sub-indication field corresponding to at least some of the information indication fields in the first DCI may be determined respectively.

For example, according to PUSCH-Config in the ServingCell-Config or BWP-DownlinkDedicated of each scheduled cell, a quantity of and/or a quantity of bits of sub-indication fields corresponding to each scheduled cell in a sub-indication field corresponding to at least some of the information indication fields may be determined respectively.

In some embodiments, in a case that a third target information indication field in the first DCI corresponds to a sub-indication field, the first DCI schedules a target object, where the third target information indication field is an information indication field of a preset first type.

That is, in a case that only one sub-indication field (assuming corresponding to the CC1) corresponding to the information indication field of the first type is preset in the first DCI, the first DCI can schedule only one target object.

For example, the information indication field of the first type is a first information indication field, and the information indication field of the preset first type may be an information indication field, some specific information indication fields, a preset quantity of information indication fields, or all information indication fields in the information indication field of the first type.

In some embodiments, in a case that the first DCI schedules one target object, if the first DCI includes the second information indication field and the second information indication field includes a fourth target information indication field corresponding to multiple sub-indication fields, a second target sub-indication field among the multiple sub-indication fields corresponding to the fourth target information indication field is valid.

If the first DCI includes the fourth target information indication field corresponding to the multiple sub-indication fields and the fourth target information indication field is of the second type, only a sub-indication field (the second target sub-indication field) among the multiple sub-indication fields of the fourth target information indication field is valid. For example, the second target sub-indication field corresponds to one target object scheduled by the first DCI.

In some embodiments, in a case that a fifth target information indication field in the first DCI corresponds to a sub-indication field, the first DCI schedules a target object, where the fifth target information indication field is an information indication field of a preset second type.

That is, in a case that only one sub-indication field (assuming corresponding to the CC1) corresponding to the information indication field of the second type is preset in the first DCI, the first DCI can schedule only one target object.

For example, the information indication field of the second type is a second information indication field, and the information indication field of the preset second type may be an information indication field, some specific information indication fields, a preset quantity of information indication fields, or all information indication fields in the information indication field of the second type.

In some embodiments, in a case that the first DCI schedules one target object, if the first DCI includes the first information indication field and the first information indication field includes a sixth target information indication field corresponding to multiple sub-indication fields, a third target sub-indication field among the multiple sub-indication fields corresponding to the sixth target information indication field is valid.

If the first DCI includes the sixth target information indication field corresponding to the multiple sub-indication fields and the sixth target information indication field is of the first type, only a sub-indication field (the third target sub-indication field) among the multiple sub-indication fields of the sixth target information indication field is valid. For example, the third target sub-indication field corresponds to one target object scheduled by the first DCI.

In some embodiments, in a case that a preset information indication field in at least some of the information indication fields in the first DCI corresponds to one sub-indication field, the first DCI schedules one target object.

that is, in a case that only one corresponding sub-indication field exists in the preset information indication field in at least some of the information indication fields, it can be determined that the first DCI schedules only one target object.

For example, the preset information indication field may be an information indication field, some specific information indication fields, a preset quantity of information indication fields, or all information indication fields in the information indication fields of the first DCI, that is, a type of the information indication fields in the preset information indication fields may be the first type and/or the second type.

It should be noted that the information determining method provided in this embodiment of this application may be performed by an information determining apparatus or a control module included in the information determining apparatus and configured to perform the information determining method. In an embodiment of this application, the information determining apparatus provided in this embodiment of this application is described by using an example in which the information determining method is performed by the information determining apparatus.

Figure 4:
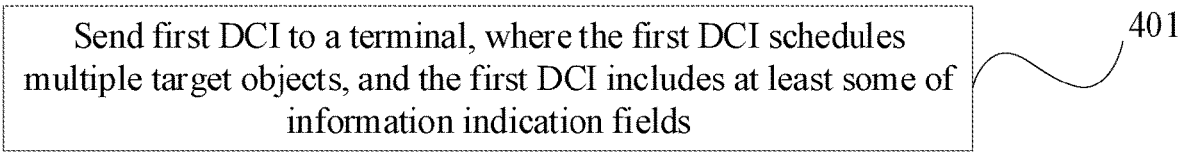
FIG. 4 is a schematic flowchart of an information sending method according to an embodiment of this application.

As shown in FIG. 4, an embodiment of this application further provides an information sending method, applied to a network side device and including:

Step 401: Send first DCI to a terminal, where the first DCI schedules multiple target objects, and the first DCI includes at least some of information indication fields.

In some embodiments, a target object includes at least one of a carrier, a cell, or a BWP.

In some embodiments, at least some of the information indication fields in the first DCI include a first information indication field of a first type and/or a second information indication field of a second type.

Figure 5:
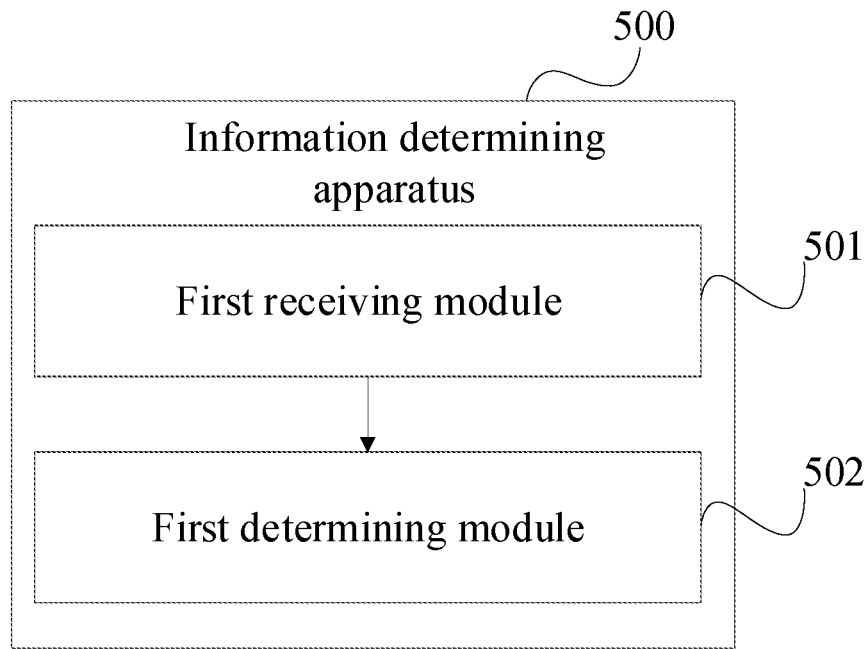
FIG. 5 is a schematic diagram of a module of an information determining apparatus according to an embodiment of this application.

As shown in FIG. 5, an embodiment of this application further provides an information determining apparatus 500, applied to a terminal and including:

a first receiving module 501, configured to receive first downlink control information DCI, where the first DCI schedules multiple target objects; and a first determining module 502, configured to determine feature information of at least some of information indication fields in the first DCI.

In some embodiments, a target object includes at least one of a carrier, a cell, or a BWP.

In some embodiments, the feature information of at least some of the information indication fields includes at least one of the following:

a quantity of sub-indication fields corresponding to each information indication field in at least some of the information indication fields;

a quantity of bits of each information indication field in at least some of the information indication fields; or a quantity of sub-indication fields corresponding to each information indication field in at least some of the information indication fields; or a type of at least some of the information indication fields.

In some embodiments, the determining feature information of at least some of the information indication fields in the first DCI includes at least one of the following:

obtaining feature indication information, where the feature indication information indicates feature information of at least some of the information indication fields; and determining a type of at least some of the information indication fields in the first DCI, and determining sub-feature information of at least some of the information indication fields according to the type of at least some of the information indication fields.

The sub-feature information includes at least one of the following:

a quantity of sub-indication fields corresponding to each information indication field in at least some of the information indication fields;

a quantity of bits of each information indication field in at least some of the information indication fields; or a quantity of bits of sub-indication fields corresponding to each information indication field in at least some of the information indication fields.

In some embodiments, determining the type of at least some of the information indication fields in the first DCI includes:

obtaining type indication information, where the type indication information indicates a type of at least some of the information indication fields.

In some embodiments, the type indication information indicates a type of each information indication field in at least some of the information indication fields.

In some embodiments, at least some of the information indication fields in the first DCI include a first information indication field of a first type and/or a second information indication field of a second type.

In some embodiments, in a case that the first DCI includes the first information indication field, a quantity of sub-indication fields corresponding to any information indication field of the first information indication field is N or M, where M<N, and N is a quantity of the multiple target objects.

In some embodiments, the first information indication field is a required information indication field in the first DCI and/or the first information indication field has a default value.

In some embodiments, the first type is a special type.

In some embodiments, in a case that the DCI includes a second information indication field, a quantity of sub-indication fields corresponding to any information indication field in the second information indication field is N or 1, where N is a quantity of the multiple target objects.

In some embodiments, the second information indication field is an information indication field in the first DCI and/or the second information indication field does have a default value.

In some embodiments, the second type is a shareable type.

In some embodiments, after the determining feature information of at least some of the information indication fields in the first DCI, the method further includes:

determining scheduling information for the multiple target objects according to the feature information of at least some of the information indication fields in the first DCI.

In some embodiments, the feature information of at least some of the information indication fields includes the quantity of the sub-indication fields corresponding to each information indication field in at least some of the information indication fields.

In a case that the first DCI includes the first information indication field of the first type, the determining scheduling information for the multiple target objects according to the feature information of at least some of the information indication fields in the first DCI includes:

in a case that the first information indication field includes a first target information indication field, and at least some of M sub-indication fields of the first target information indication field have a corresponding first target object, determining at least one of the following:

that the first target object is scheduled according to a corresponding sub-indication field; and at least some of other target objects do not support a function corresponding to a first target information indication field, where the first target information indication field is an information indication field in which a quantity of corresponding sub-indication fields in the first information indication field is M.

In some embodiments, the feature information of at least some of the information indication fields includes the quantity of the sub-indication fields corresponding to each information indication field in at least some of the information indication fields.

In a case that the first DCI includes the first information indication field of the first type, the determining scheduling information for the multiple target objects according to the feature information of at least some of the information indication fields in the first DCI includes:

in a case that the first information indication field includes a first target information indication field, and at least some of M sub-indication fields of the first target information indication field have a corresponding first target object, determining at least one of the following:

that the first target object is scheduled according to a corresponding sub-indication field; and that at least some of other target objects support the function corresponding to the first target information indication field; or that at least some of other target objects are scheduled according to a first adjusted sub-indication field.

The first adjusted sub-indication field is a result after a sub-indication field corresponding to the first target object is adjusted by using a first preset offset, and the first target information indication field is an information indication field with a quantity of corresponding sub-indication fields in the first information indication field of M.

In some embodiments, the feature information of at least some of the information indication fields includes the quantity of the sub-indication fields corresponding to each information indication field in at least some of the information indication fields.

In a case that the first DCI includes the second information indication field of second first type, the determining scheduling information for the multiple target objects according to the feature information of at least some of the information indication fields in the first DCI includes:

in a case that the second information indication field includes a second target information indication field, and a sub-indication field of the second target information indication field has a corresponding second target object, determining at least one of the following:

that the second target object is scheduled according to a corresponding sub-indication field;

that at least some of other target objects support a function corresponding to the second target information indication field; or that at least some of other target objects are scheduled according to a sub-indication field corresponding to at least some of the second target objects or at least some of other target objects are scheduled according to a second adjusted sub-indication field.

The second adjusted indication field is a result after a sub-indication field corresponding to the second target object is adjusted by using a second preset offset, and the second target information indication field is an information indication field with a quantity of corresponding sub-indication fields in the second information indication field of 1.

In some embodiments, the determining feature information of at least some of the information indication fields includes:

determining the feature information of at least some of the information indication fields according to first configuration information of a scheduling cell.

In some embodiments, the determining feature information of at least some of the information indication fields includes:

determining, according to the first configuration information of the scheduling cell, a quantity of and/or a quantity of bits of first target sub-indication fields in sub-indication fields corresponding to at least some of the information indication fields, where a first target sub-indication field is a sub-indication field corresponding to a scheduled cell.

In some embodiments, the first configuration information of the scheduling cell includes second configuration information of each scheduled cell.

In some embodiments, in a case that a third target information indication field in the first DCI corresponds to one sub-indication field, the first DCI schedules one target object, where the third target information indication field is an information indication field of a preset first type.

In some embodiments, in a case that the first DCI schedules one target object, if the first DCI includes the second information indication field and the second information indication field includes a fourth target information indication field corresponding to multiple sub-indication fields, a second target sub-indication field among the multiple sub-indication fields corresponding to the fourth target information indication field is valid.

In some embodiments, the second target sub-indication field corresponds to one target object scheduled by the first DCI.

In some embodiments, in a case that a fifth target information indication field in the first DCI corresponds to one sub-indication field, the first DCI schedules one target object, where the fifth target information indication field is an information indication field of a preset second type.

In some embodiments, in a case that the first DCI schedules one target object, if the first DCI includes the first information indication field and the first information indication field includes a sixth target information indication field corresponding to multiple sub-indication fields, a third target sub-indication field among the multiple sub-indication fields corresponding to the sixth target information indication field is valid.

In some embodiments, the third target sub-indication field corresponds to one target object scheduled by the first DCI.

In some embodiments, in a case that a preset information indication field in at least some of the information indication fields in the first DCI corresponds to one sub-indication field, the first DCI schedules one target object.

The information determining apparatus in this embodiment of this application may be an apparatus, or may be a component, an integrated circuit, or a chip in a terminal. The apparatus may be a mobile terminal, or a non-mobile terminal. For example, the mobile terminal may include but is not limited to the foregoing listed types of terminals 11. The non-mobile terminal may be a server, a Network Attached Storage (NAS), a Personal Computer (PC), a Television (TV), a teller machine, a self-service machine, or the like. This is not specifically limited in this embodiment of this application.

The information determining apparatus in this embodiment of this application may be an apparatus with an operating system. The operating system may be an Android operating system, may be an iOS operating system, or may be another possible operating system, which is not specifically limited in the embodiments of this application.

The information determining apparatus provided in this embodiment of this application can implement each process of the embodiment of the information determining method, and a same technical effect can be achieved. To avoid repetition, details are not described herein again.

Figure 6:
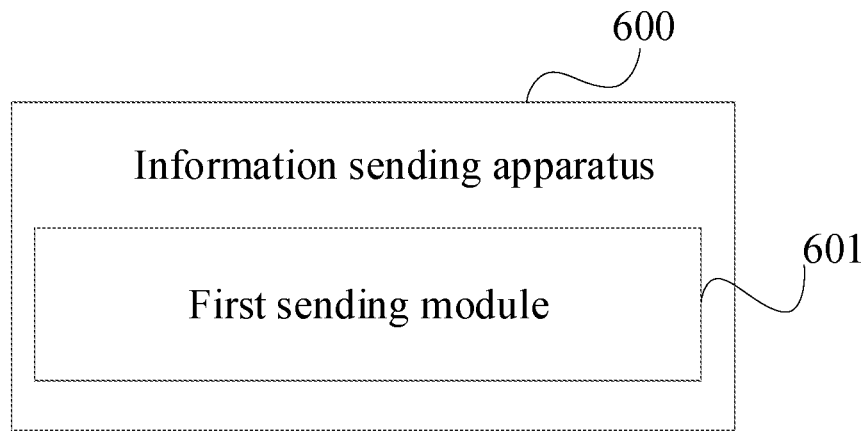
FIG. 6 is a schematic diagram of a module of an information sending apparatus according to an embodiment of this application.

As shown in FIG. 6, an embodiment of this application further provides an information sending apparatus 600, applied to a network side device and including:

a first sending module 601, configured to sending first DCI to a terminal, where the first DCI schedules multiple target objects, and the first DCI includes at least some of information indication fields.

In some embodiments, a target object includes at least one of a carrier, a cell, or a BWP.

In some embodiments, at least some of the information indication fields in the first DCI include a first information indication field of a first type and/or a second information indication field of a second type.

The information sending apparatus in this embodiment of this application may be an apparatus, or may be a component, an integrated circuit, or a chip in a network side device. The network side device may be a base station.

The information sending apparatus provided in this embodiment of this application can implement each process of the embodiment of the information sending method, and a same technical effect can be achieved. To avoid repetition, details are not described herein again.

Figure 7:
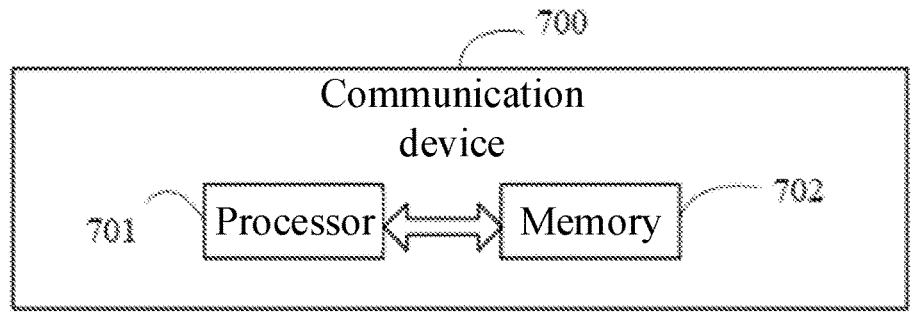
FIG. 7 is a structural block diagram of a communication device according to an embodiment of this application.

In some embodiments, as shown in FIG. 7, an embodiment of this application further provides a communication device 700, including a processor 701, a memory 702, a program or an instruction that is stored in the memory 702 and that can run on the processor 701. For example, when the communication device 700 is a terminal, the program or the instruction is executed by the processor 701 to implement each process of the embodiment of the information determining method, and a same technical effect can be achieved. In a case that the communication device 700 is a network side device, when the program or the instruction is executed by the processor 701, each process in the embodiment of the information sending method is implemented, and a same technical effect can be achieved. To avoid repetition, details are not described herein again.

Figure 8:
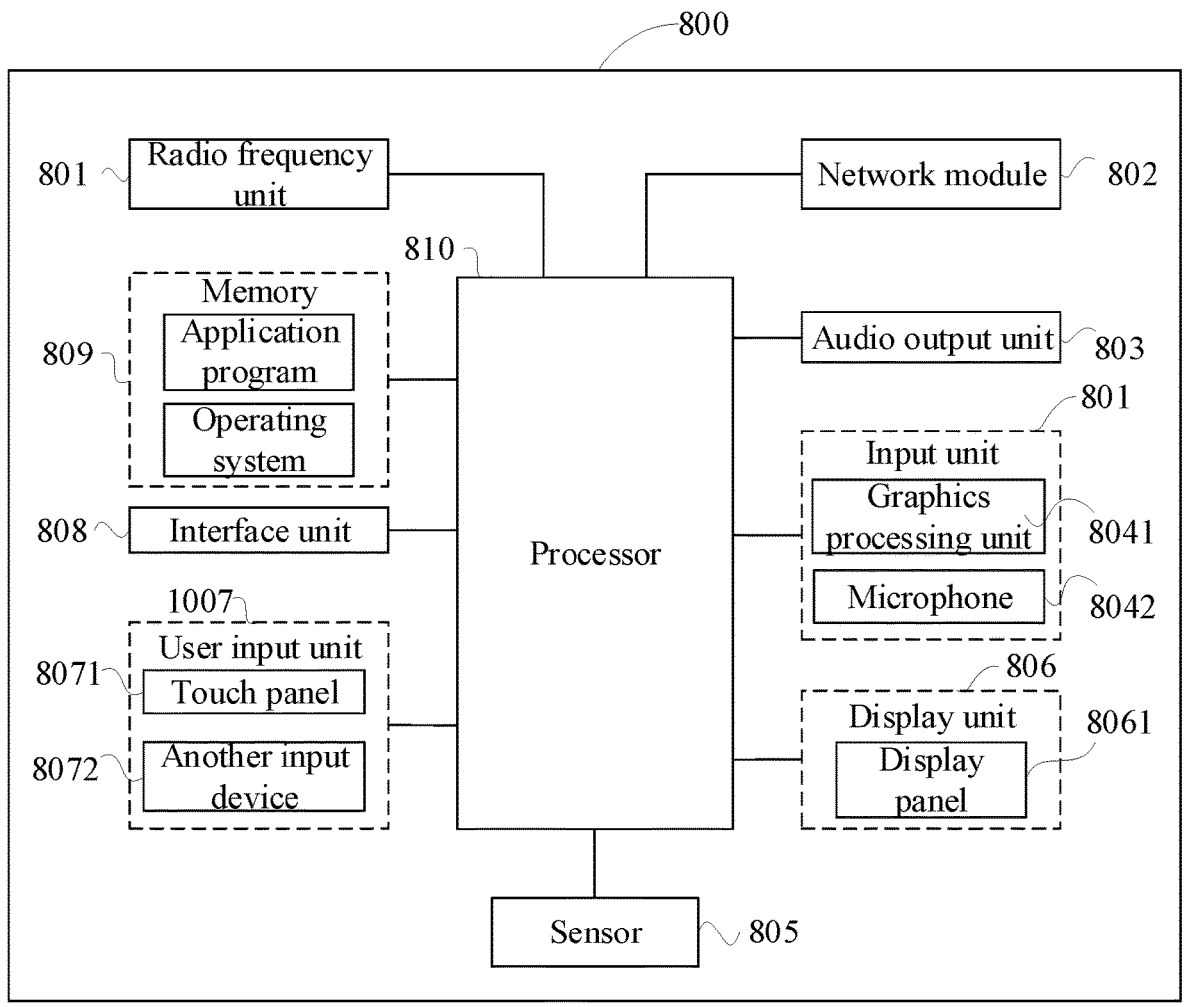
FIG. 8 is a structural block diagram of a terminal according to an embodiment of this application.

FIG. 8 is a schematic diagram of a hardware structure of a terminal according to an embodiment of this application.

The terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the terminal 800 may further include a power supply (such as a battery) that supplies power to each component. The power supply may be logically connected to the processor 810 by using a power supply management system, to implement functions such as charging and discharging management, and power consumption management by using the power supply management system. The terminal structure shown in FIG. 8 constitutes no limitation on the terminal, and the terminal may include more or fewer components than those shown in the figure, or combine some components, or have different component arrangements. Details are not described herein.

It should be understood that, in this embodiment of this application, the input unit 804 may include a Graphics Processing Unit (GPU) 8041 and a microphone 8042. The GPU 8041 processes image data of a static picture or a video obtained by an image capture apparatus (such as a camera) in a video capture mode or an image capture mode. The display unit 806 may include a display panel 8061, and the display panel 8061 may be configured in a form of a liquid crystal display, an organic light-emitting diode, or the like. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein.

In this embodiment of this application, the radio frequency unit 801 receives downlink data from a network side device and then sends the downlink data to the processor 810 for processing; and sends uplink data to the network side device. Usually, the radio frequency unit 801 includes but is not limited to an antenna, at least one amplifier, a transceiver, a coupler, a low noise amplifier, a duplexer, and the like.

The memory 809 may be configured to store a software program or an instruction and various data. The memory 809 may mainly include a program or instruction storage area and a data storage area. The program or instruction storage area may store an operating system, and an application or an instruction required by at least one function (for example, a sound playing function or an image playing function). In addition, the memory 809 may include a high-speed random access memory, and may further include a non-volatile memory. The non-volatile memory may be a Read-Only Memory (ROM), a Programmable ROM (PROM), an Erasable PROM (EPROM), an Electrically EPROM (EE-PROM), or a flash memory, for example, at least one disk storage component, a flash memory component, or another non-volatile solid-state storage component.

The processor 810 may include one or more processing units. In some embodiments, an application processor and a modem processor may be integrated into the processor 810. The application processor mainly processes an operating system, a user interface, an application, an instruction, or the like. The modem processor mainly processes wireless communications, for example, a baseband processor. It can be understood that, in some alternative embodiments, the modem processor may not be integrated into the processor 810.

The radio frequency unit 801 is configured to receive first downlink control information DCI, where the first DCI schedules multiple target objects; and the processor 810 is configured to determine feature information of at least some of information indication fields in the first DCI.

In some embodiments, the processor 810 is further configured to determine scheduling information for the multiple target objects according to the feature information of at least some of the information indication fields in the first DCI.

In some embodiments, a target object includes at least one of a carrier, a cell, or a BWP.

In some embodiments, the feature information of at least some of the information indication fields includes at least one of the following:
 a quantity of sub-indication fields corresponding to each information indication field in at least some of the information indication fields;
 a quantity of bits of each information indication field in at least some of the information indication fields; or
 a quantity of sub-indication fields corresponding to each information indication field in at least some of the information indication fields; or
 a type of at least some of the information indication fields.

In some embodiments, the determining feature information of at least some of the information indication fields in the first DCI includes at least one of the following:
 obtaining feature indication information, where the feature indication information indicates feature information of at least some of the information indication fields; and
 determining a type of at least some of the information indication fields in the first DCI, and determining sub-feature information of at least some of the information indication fields according to the type of at least some of the information indication fields.

The sub-feature information includes at least one of the following:
 a quantity of sub-indication fields corresponding to each information indication field in at least some of the information indication fields;
 a quantity of bits of each information indication field in at least some of the information indication fields; or
 a quantity of bits of sub-indication fields corresponding to each information indication field in at least some of the information indication fields.

In some embodiments, determining the type of at least some of the information indication fields in the first DCI includes:
 obtaining type indication information, where the type indication information indicates a type of at least some of the information indication fields.

In some embodiments, the type indication information indicates a type of each information indication field in at least some of the information indication fields.

In some embodiments, at least some of the information indication fields in the first DCI include a first information indication field of a first type and/or a second information indication field of a second type.

In some embodiments, in a case that the first DCI includes the first information indication field, a quantity of sub-indication fields corresponding to any information indication field of the first information indication field is N or M, where M<N, and N is a quantity of the multiple target objects.

In some embodiments, the first information indication field is a required information indication field in the first DCI and/or the first information indication field has a default value.

In some embodiments, the first type is a special type.

In some embodiments, in a case that the DCI includes a second information indication field, a quantity of sub-indication fields corresponding to any information indication field in the second information indication field is N or 1, where N is a quantity of the multiple target objects.

In some embodiments, the second information indication field is an information indication field in the first DCI and/or the second information indication field does have a default value.

In some embodiments, the second type is a shareable type.

In some embodiments, after the determining feature information of at least some of the information indication fields in the first DCI, the method further includes:
 determining scheduling information for the multiple target objects according to the feature information of at least some of the information indication fields in the first DCI.

In some embodiments, the feature information of at least some of the information indication fields includes the quantity of the sub-indication fields corresponding to each information indication field in at least some of the information indication fields.

In a case that the first DCI includes the first information indication field of the first type, the determining scheduling information for the multiple target objects according to the feature information of at least some of the information indication fields in the first DCI includes:
 in a case that the first information indication field includes a first target information indication field, and at least some of M sub-indication fields of the first target information indication field have a corresponding first target object, determining at least one of the following:
 that the first target object is scheduled according to a corresponding sub-indication field; and
 at least some of other target objects do not support a function corresponding to a first target information indication field, where the first target information indication field is an information indication field in which a quantity of corresponding sub-indication fields in the first information indication field is M.

In some embodiments, the feature information of at least some of the information indication fields includes the quantity of the sub-indication fields corresponding to each information indication field in at least some of the information indication fields.

In a case that the first DCI includes the first information indication field of the first type, the determining scheduling information for the multiple target objects according to the feature information of at least some of the information indication fields in the first DCI includes:
 in a case that the first information indication field includes a first target information indication field, and at least some of M sub-indication fields of the first target information indication field have a corresponding first target object, determining at least one of the following:
 that the first target object is scheduled according to a corresponding sub-indication field; and
 that at least some of other target objects support the function corresponding to the first target information indication field; or
 that at least some of other target objects are scheduled according to a first adjusted sub-indication field.

The first adjusted sub-indication field is a result after a sub-indication field corresponding to the first target object is adjusted by using a first preset offset, and the first target information indication field is an information indication field with a quantity of corresponding sub-indication fields in the first information indication field of M.

In some embodiments, the feature information of at least some of the information indication fields includes the quantity of the sub-indication fields corresponding to each information indication field in at least some of the information indication fields.

In a case that the first DCI includes the second information indication field of second first type, the determining scheduling information for the multiple target objects according to the feature information of at least some of the information indication fields in the first DCI includes:

in a case that the second information indication field includes a second target information indication field, and a sub-indication field of the second target information indication field has a corresponding second target object, determining at least one of the following:

that the second target object is scheduled according to a corresponding sub-indication field;

that at least some of other target objects support a function corresponding to the second target information indication field; or that at least some of other target objects are scheduled according to a sub-indication field corresponding to at least some of the second target objects or at least some of other target objects are scheduled according to a second adjusted sub-indication field.

The second adjusted indication field is a result after a sub-indication field corresponding to the second target object is adjusted by using a second preset offset, and the second target information indication field is an information indication field with a quantity of corresponding sub-indication fields in the second information indication field of 1.

In some embodiments, the determining feature information of at least some of the information indication fields includes:

determining the feature information of at least some of the information indication fields according to first configuration information of a scheduling cell.

In some embodiments, the determining feature information of at least some of the information indication fields includes:

determining, according to the first configuration information of the scheduling cell, a quantity of and/or a quantity of bits of first target sub-indication fields in sub-indication fields corresponding to at least some of the information indication fields, where a first target sub-indication field is a sub-indication field corresponding to a scheduling cell.

In some embodiments, the first configuration information of the scheduling cell includes second configuration information of each scheduled cell.

In some embodiments, in a case that a third target information indication field in the first DCI corresponds to one sub-indication field, the first DCI schedules one target object, where the third target information indication field is an information indication field of a preset first type.

In some embodiments, in a case that the first DCI schedules one target object, if the first DCI includes the second information indication field and the second information indication field includes a fourth target information indication field corresponding to multiple sub-indication fields, a second target sub-indication field among the multiple sub-indication fields corresponding to the fourth target information indication field is valid.

In some embodiments, the second target sub-indication field corresponds to one target object scheduled by the first DCI.

In some embodiments, in a case that a fifth target information indication field in the first DCI corresponds to one sub-indication field, the first DCI schedules one target object, where the fifth target information indication field is an information indication field of a preset second type.

In some embodiments, in a case that the first DCI schedules one target object, if the first DCI includes the first information indication field and the first information indication field includes a sixth target information indication field corresponding to multiple sub-indication fields, a third target sub-indication field among the multiple sub-indication fields corresponding to the sixth target information indication field is valid.

In some embodiments, the third target sub-indication field corresponds to one target object scheduled by the first DCI.

In some embodiments, in a case that a preset information indication field in at least some of the information indication fields in the first DCI corresponds to one sub-indication field, the first DCI schedules one target object.

Figure 9:
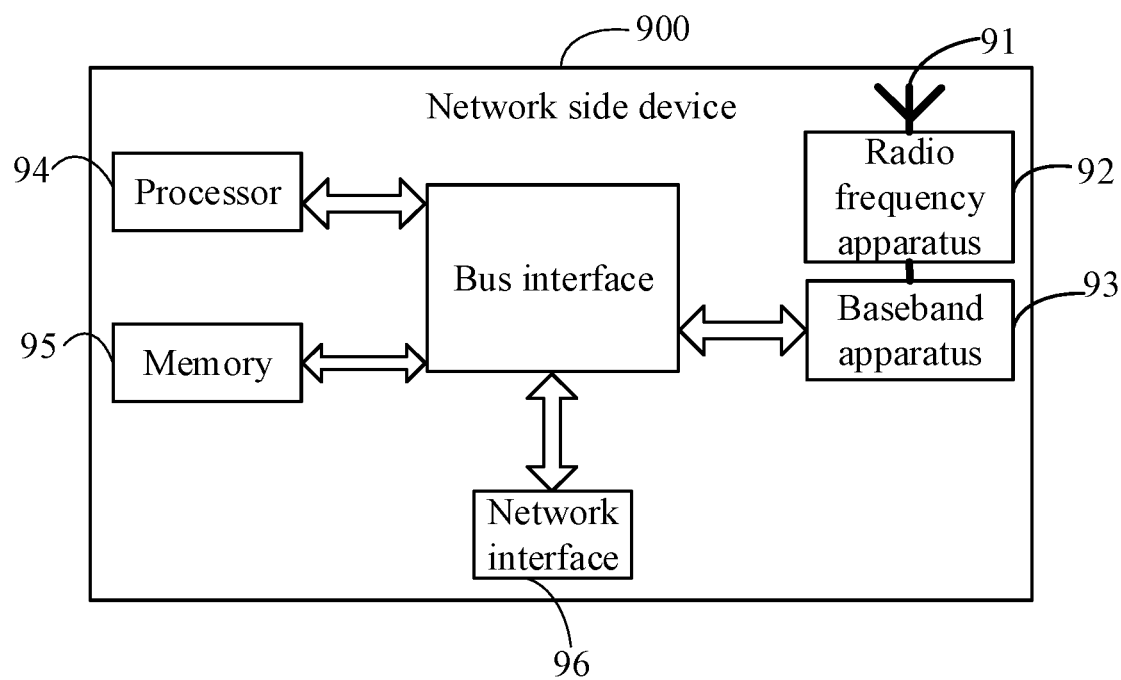
FIG. 9 is a structural block diagram of a network device according to an embodiment of this application.

For example, an embodiment of this application further provides a network side device. As shown in FIG. 9, a network device 900 includes an antenna 91, a radio frequency apparatus 92, and a baseband apparatus 93. The antenna 91 is connected to the radio frequency apparatus 92. In an uplink direction, the radio frequency apparatus 92 receives information by using the antenna 91, and transmits the received information to the baseband apparatus 93 for processing. In a downlink direction, the baseband apparatus 93 processes information that needs to be sent, and sends processed information to the radio frequency apparatus 92. The radio frequency apparatus 92 processes the received information, and sends processed information by using the antenna 91.

The frequency band processing apparatus may be located in the baseband apparatus 93. The method performed by the network-side device in the foregoing embodiment may be implemented in the baseband apparatus 93. The baseband apparatus 93 includes a processor 94 and a memory 95.

The baseband apparatus 93 may include, for example, at least one baseband board, where multiple chips are disposed on the baseband board. As shown in FIG. 9, one chip is, for example, the processor 94, which is connected to the memory 95, so as to invoke a program in the memory 95 to perform operations of the network device shown in the foregoing method embodiment.

The baseband apparatus 93 may further include a network interface 96, configured to exchange information with the radio frequency apparatus 92, where the interface is, for example, a Common Public Radio Interface (CPRI).

For example, the network side device in this embodiment of this application further includes an instruction or a program that is stored in the memory 95 and that can run on the processor 94. The processor 94 invokes the instruction or the program stored in the memory 95 to perform the information sending method, and a same technical effect is achieved. To avoid repetition, details are not described herein.

An embodiment of this application further provides a readable storage medium, where the readable storage medium stores a program or an instruction, and when the program or the instruction is executed by a processor, the processes of the foregoing information determining method and information sending method are implemented and a same technical effect can be achieved. To avoid repetition, details are not described herein again.

The processor is a processor in the terminal in the above embodiment. The readable storage medium includes a computer-readable storage medium, such as a computer ROM, a Random Access Memory (RAM), a magnetic disk, or an optical disc.

An embodiment of this application further provides a chip, where the chip includes a processor and a communication interface, the communication interface is coupled to the processor, and the processor is configured to run a program or an instruction to implement the processes of the foregoing information determining method and information sending method, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a universal hardware platform or by hardware only. In some embodiments, the technical solutions of this application, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

It should be understood that division of modules is merely logical function division. The modules may be all or partially integrated in a physical entity or may be physically separated in an actual implementation. The modules may be all implemented in a form of software invoked by a processing component, or may be all implemented in a form of hardware; or a part of modules may be implemented in a form of software invoked by a processing component, and another part of modules may be implemented in a form of hardware. For example, a receiving module may be a processing element separately disposed, or may be integrated in a chip of the foregoing apparatus for implementation. In addition, the receiving module may be stored in a memory of the foregoing apparatus in a form of program code, and is invoked by a processing element of the foregoing apparatus to perform a function of the foregoing receiving module. The implementations of other modules are similar thereto. In addition, the modules may be all or partially integrated, or may be implemented independently. The processing element herein may be an integrated circuit having a signal processing capability. During implementation, various steps of the foregoing method or the foregoing modules may be completed through an integrated logic circuit of the hardware in the processor element or a command in the form of software.

For example, the modules, units, sub-units, or sub-modules may be one or more integrated circuits configured to implement the foregoing methods, for example, one or more Application Specific Integrated Circuit (ASIC), one or more microprocessors (e.g., Digital Signal Processor (DSP)), or one or more Field Programmable Gate Array (FPGA). For another example, when one of the foregoing modules is implemented in the form of program code being scheduled by a processing element, the processing element may be a general-purpose processor, such as a Central Processing Unit (CPU) or another processor that can invoke program code. For another example, these modules may be integrated and implemented in a form of a System-On-a-Chip (SOC).

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. An information determining method, performed by a terminal, comprising:
receiving first Downlink Control Information (DCI), wherein the first DCI schedules multiple target objects; and
determining feature information of at least some of information indication fields in the first DCI,
wherein determining the feature information of at least some of the information indication fields in the first DCI comprises:
obtaining type indication information, wherein the type indication information indicates a type of at least some of the information indication fields.

2. The information determining method according to claim 1, wherein a target object comprises at least one of a carrier, a cell, or a Bandwidth Part (BWP).

3. The information determining method according to claim 1, wherein the feature information of at least some of the information indication fields comprises at least one of the following:
a quantity of sub-indication fields corresponding to each information indication field in at least some of the information indication fields;
a quantity of bits of each information indication field in at least some of the information indication fields;
a quantity of bits of sub-indication fields corresponding to each information indication field in at least some of the information indication fields; or
a type of at least some of the information indication fields.

4. The information determining method according to claim 1, wherein the determining feature information of at least some of information indication fields in the first DCI further comprises:
  determining the type of at least some of the information indication fields in the first DCI based on the obtained type indication information, and determining sub-feature information of at least some of the information indication fields according to the type of at least some of the information indication fields,
  wherein the sub-feature information comprises at least one of the following:
  a quantity of sub-indication fields corresponding to each information indication field in at least some of the information indication fields;
  a quantity of bits of each information indication field in at least some of the information indication fields; or
  a quantity of bits of sub-indication fields corresponding to each information indication field in at least some of the information indication fields.

5. The information determining method according to claim 1, wherein the type indication information comprises a type of each information indication field in at least some of the information indication fields.

6. The information determining method according to claim 1, wherein:
  the at least some of the information indication fields in the first DCI comprises a first information indication field of a first type, wherein one first information indication field corresponds to one of the multiple target objects, or one sub-indication field of the first information indication field corresponds to one of the multiple target objects; or
  the at least some of the information indication fields in the first DCI comprises a second information indication field of a second type, wherein one second information indication field corresponds to a plurality of the multiple target objects.

7. The information determining method according to claim 6, wherein when that the first DCI comprises the first information indication field, a quantity of sub-indication fields corresponding to any information indication field in the first information indication field is N or M, wherein M<N, and N is a quantity of the multiple target objects.

8. The information determining method according to claim 6, wherein the first information indication field is a required information indication field in the first DCI or the first information indication field has a default value.

9. The information determining method according to claim 6, wherein when the first DCI comprises the second information indication field, a quantity of sub-indication fields corresponding to any information indication field in the second information indication field is N or 1, wherein N is a quantity of the multiple target objects.

10. The information determining method according to claim 6, wherein the second information indication field is an information indication field in the first DCI or the second information indication field does not have a default value.

11. The information determining method according to claim 1,
  wherein after the determining feature information of at least some of information indication fields in the first DCI, the method further comprises:
  determining scheduling information for the multiple target objects according to the feature information of at least some of the information indication fields in the first DCI.

12. The information determining method according to claim 11, wherein the feature information of at least some of the information indication fields comprises a quantity of sub-indication fields corresponding to each information indication field in at least some of the information indication fields; and
  when the first DCI comprises the first information indication field of the first type, the determining scheduling information for the multiple target objects according to the feature information of at least some of the information indication fields in the first DCI comprises:
    when the first information indication field comprises a first target information indication field, and at least some of M sub-indication fields of the first target information indication field have a corresponding first target object,
    determining at least one of the following:
      that the first target object is scheduled according to a corresponding sub-indication field; or
      that at least some of other target objects do not support a function corresponding to the first target information indication field,
      wherein the first target information indication field is an information indication field in which a quantity of corresponding sub-indication fields in the first information indication field is M,
    or
    determining at least one of the following:
      that the first target object is scheduled according to a corresponding sub-indication field;
      that at least some of other target objects support a function corresponding to the first target information indication field; or
      that at least some of other target objects are scheduled according to a first adjusted sub-indication field, wherein the first adjusted sub-indication field is a result after a sub-indication field corresponding to the first target object is adjusted by using a first preset offset, and the first target information indication field is an information indication field with a quantity of corresponding sub-indication fields in the first information indication field of M,
  or
  when the first DCI comprises the second information indication field of the second type, the determining scheduling information for the multiple target objects according to the feature information of at least some of the information indication fields in the first DCI comprises:
    when the second information indication field comprises a second target information indication field, and a sub-indication field of the second target information indication field has a corresponding second target object, determining at least one of the following:
      that the second target object is scheduled according to a corresponding sub-indication field;
      that at least some of other target objects support a function corresponding to the second target information indication field; or
      that at least some of other target objects are scheduled according to a sub-indication field corresponding to at least some of the second target objects or at least some of other target objects are scheduled according to a second adjusted sub-indication field, wherein the second adjusted sub-indication field is a result after a sub-indication field corresponding to the second target object is adjusted by using a second preset offset, and the second target information indication field is an information indication field with a quantity of corresponding sub-indication fields in the second information indication field of 1.

13. The information determining method according to claim 1, wherein the determining feature information of at least some of information indication fields comprises:
determining the feature information of at least some of the information indication fields according to first configuration information of a scheduling cell.

14. The information determining method according to claim 13, wherein the determining feature information of at least some of information indication fields comprises:
determining, according to the first configuration information of the scheduling cell, a quantity of or a quantity of bits of first target sub-indication fields in sub-indication fields corresponding to at least some of the information indication fields, wherein a first target sub-indication field is a sub-indication field corresponding to a scheduled cell.

15. The information determining method according to claim 7, wherein when a third target information indication field in the first DCI corresponds to one sub-indication field, the first DCI schedules one target object,
wherein the third target information indication field is an information indication field of a preset first type,
wherein when the first DCI schedules one target object, if the first DCI comprises the second information indication field and the second information indication field comprises a fourth target information indication field corresponding to multiple sub-indication fields, a second target sub-indication field among the multiple sub-indication fields corresponding to the fourth target information indication field is valid,
wherein the second target sub-indication field corresponds to one target object scheduled by the first DCI.

16. The information determining method according to claim 7, wherein when a fifth target information indication field in the first DCI corresponds to one sub-indication field, the first DCI schedules one target object,
wherein the fifth target information indication field is an information indication field of a preset second type,
wherein when the first DCI schedules one target object, if the first DCI comprises the first information indication field and the first information indication field comprises a six target information indication field corresponding to multiple sub-indication fields, a third target sub-indication field among the multiple sub-indication fields corresponding to the six target information indication field is valid,
wherein the third target sub-indication field corresponds to one target object scheduled by the first DCI.

17. The information determining method according to claim 1, wherein the type indication information is sent by a network side device.

18. An information sending method, performed by a network side device, comprising:
sending first Downlink Control Information (DCI) to a terminal, wherein the first DCI schedules multiple target objects, and the first DCI comprises at least some of information indication fields, wherein type indication information, sent by the network side device, indicates a type of at least some of the information indication fields.

19. A network side device, comprising: a processor and a memory having a computer program or an instruction stored thereon, wherein the computer program or the instruction, when executed by the processor, causes the processor to perform the information sending method according to claim 18.

20. A terminal, comprising: a processor; a memory having a computer program or an instruction stored thereon, wherein the computer program or the instruction, when executed by the processor, causes the processor to perform an information determining method, comprising:
receiving first Downlink Control Information (DCI), wherein the first DCI schedules multiple target objects; and
determining feature information of at least some of information indication fields in the first DCI,
wherein determining the feature information of at least some of the information indication fields in the first DCI comprises:
obtaining type indication information, wherein the type indication information indicates a type of at least some of the information indication fields.

* * * * *